United States Patent

Walker

(10) Patent No.: US 8,548,407 B2
(45) Date of Patent: Oct. 1, 2013

(54) APPARATUS TO COMMUNICATE MULTIPLE SIGNALS FROM MULTIPLE ANTENNAS ON A SINGLE CABLE

(75) Inventor: Glenn A. Walker, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 155 days.

(21) Appl. No.: 13/209,932

(22) Filed: Aug. 15, 2011

(65) Prior Publication Data

US 2013/0044826 A1 Feb. 21, 2013

(51) Int. Cl.
H04B 7/08 (2006.01)
H04B 1/06 (2006.01)
H04B 1/18 (2006.01)

(52) U.S. Cl.
CPC . *H04B 1/18* (2013.01); *H04B 7/084* (2013.01)
USPC ........... 455/132; 455/139; 455/273; 455/275; 455/289

(58) Field of Classification Search
USPC ................. 455/132, 133, 137, 139, 140, 272, 455/273, 275, 276.1, 277.1, 280
See application file for complete search history.

(56) References Cited

U.S. PATENT DOCUMENTS

| | | | | |
|---|---|---|---|---|
| 4,715,048 A * | 12/1987 | Masamura | ..... | 375/347 |
| 5,276,904 A * | 1/1994 | Mutzig et al. | ..... | 725/68 |
| 5,448,602 A * | 9/1995 | Ohmori et al. | ..... | 375/347 |
| 5,483,663 A * | 1/1996 | Tawil | ..... | 725/68 |
| 5,898,455 A * | 4/1999 | Barakat et al. | ..... | 725/78 |
| 5,959,592 A * | 9/1999 | Petruzzelli | ..... | 725/68 |
| 6,600,730 B1 * | 7/2003 | Davis et al. | ..... | 370/343 |
| 6,728,513 B1 * | 4/2004 | Nishina | ..... | 455/3.02 |
| 7,401,349 B2 * | 7/2008 | Knutson et al. | ..... | 725/64 |
| 7,970,366 B2 * | 6/2011 | Arita et al. | ..... | 455/130 |
| 8,204,537 B2 * | 6/2012 | Behzad et al. | ..... | 455/552.1 |

* cited by examiner

*Primary Examiner* — Duc M Nguyen
(74) *Attorney, Agent, or Firm* — Lawrence D. Hazelton

(57) ABSTRACT

An antenna assembly, a receiver, and a system configured to superimpose a first received signal from a first antenna and an intermediate signal based on a second received signal from a second antenna onto a single cable. The antenna assembly includes a mixer and an adjustable local oscillator (ALO) that frequency shift the second received signal to generate the intermediate signal. The output frequency of the ALO is controlled by a control signal superimposed on the single cable that is output by the receiver. With this arrangement, a plurality of antennas or antenna elements can be connected to a receiver using a single coaxial cable. Such an arrangement is particularly desirable to manufacturers of automobiles and other vehicles. Also, the receiver can detect if the output frequency of the ALO needs to be adjusted, and so close-loop control of the output frequency is possible.

17 Claims, 2 Drawing Sheets

APPARATUS TO COMMUNICATE MULTIPLE SIGNALS FROM MULTIPLE ANTENNAS ON A SINGLE CABLE

TECHNICAL FIELD OF INVENTION

This disclosure generally relates to an antenna assembly having a plurality of antennas that each receive signals having the same center frequency and the antenna assembly is coupled to a receiver with a single cable, and more particularly relates to an antenna assembly with one or more mixers and variable frequency local oscillators in the antenna assembly so at least one of the received signal can be converted or shifted so the information in a received signal is available at a different center frequency.

BACKGROUND OF INVENTION

It is desirable for a satellite radio receiver system to use a single coaxial cable to couple signals from an antenna assembly to a receiver. A single cable is desirable because it minimizes cost. This single cable feature is particularly desired by manufactures of automobiles because the single cable simplifies installation into the automobile. It has been suggested that signal data may be more reliably received if the antenna assembly has multiple antennas. However, if signals from multiple antennas are simply combined at the antenna assembly, there is a risk that a signal on one antenna may be 180 electrical degrees out of phase with another antenna, and so the signals will cancel each other when combined.

It has been suggested that a satellite signal received by one or more of the antennas in a multiple antenna system could be converted or frequency shifted in order to produce an intermediate signal having a different center frequency by equipping the antenna assembly with a mixer driven and a local oscillator. However, if the intermediate signal has a center frequency that is proximate to a terrestrial based broadcast signal, there is a risk of the terrestrial signal overloading an amplifier configured to amplify the relatively weak satellite level signal in the intermediate signal. To reduce the risk of overloading the amplifier, is has been suggested that a band pass filter such as a surface acoustic wave (SAW) filter be used to protect the amplifier input. However, if the pass band of the filter is narrow enough to be effective to protect the amplifier, the local oscillator frequency must be precisely controlled so the intermediate signal is in the middle of the pass band, and the local oscillator frequency may need to be changed if reception of a different satellite signal having a different center frequency is desired.

SUMMARY OF THE INVENTION

In accordance with one embodiment, an antenna assembly is provided. The assembly includes a single cable, a first antenna, a mixer, a second antenna, and an adjustable local oscillator. The single cable is configured to define an antenna end of the cable and a receiver end of the cable, and allow propagation of signals therebetween. The first antenna is configured to couple a first received signal to the antenna end. The first received signal is characterized as being centered about a received center frequency and as being modulated with data. The mixer is configured to mix a second received signal with a local oscillator signal to provide an intermediate signal. The second received signal is also characterized as a being centered about the received center frequency and being modulated with data. The intermediate signal is characterized as being centered about an intermediate center frequency distinct from the received center frequency and as being modulated with data from the second received signal. The mixer is further configured to couple the intermediate signal to the antenna end. The second antenna configured to couple the second received signal to the mixer. By this arrangement, the first received signal and the intermediate signal are superimposed on the single cable and propagate to the receiver end. The adjustable local oscillator is configured to detect a control signal originating from the receiver end and output the local oscillator signal having a local oscillator frequency dependent upon the control signal.

In another embodiment, a receiver is provided. The receiver is configured to be connected to a receiver end of a single cable coupled to an antenna assembly. The antenna assembly is configured to couple a first received signal and an intermediate signal to the receiver end. The first received signal is characterized as having a received center frequency. The intermediate signal is based on a second received signal mixed with a local oscillator signal. The second received signal is also characterized as having a received center frequency. The local oscillator signal is characterized as having a local oscillator frequency that is dependent on a control signal. By this arrangement, the first received signal and the intermediate signal are superimposed on the single cable to propagate to the receiver end. The receiver includes a processor coupled to the receiver end. The processor is configured to determine the control signal based on the received center frequency.

In yet another embodiment, a communication system is provided. The system includes the antenna assembly and the receiver described above.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
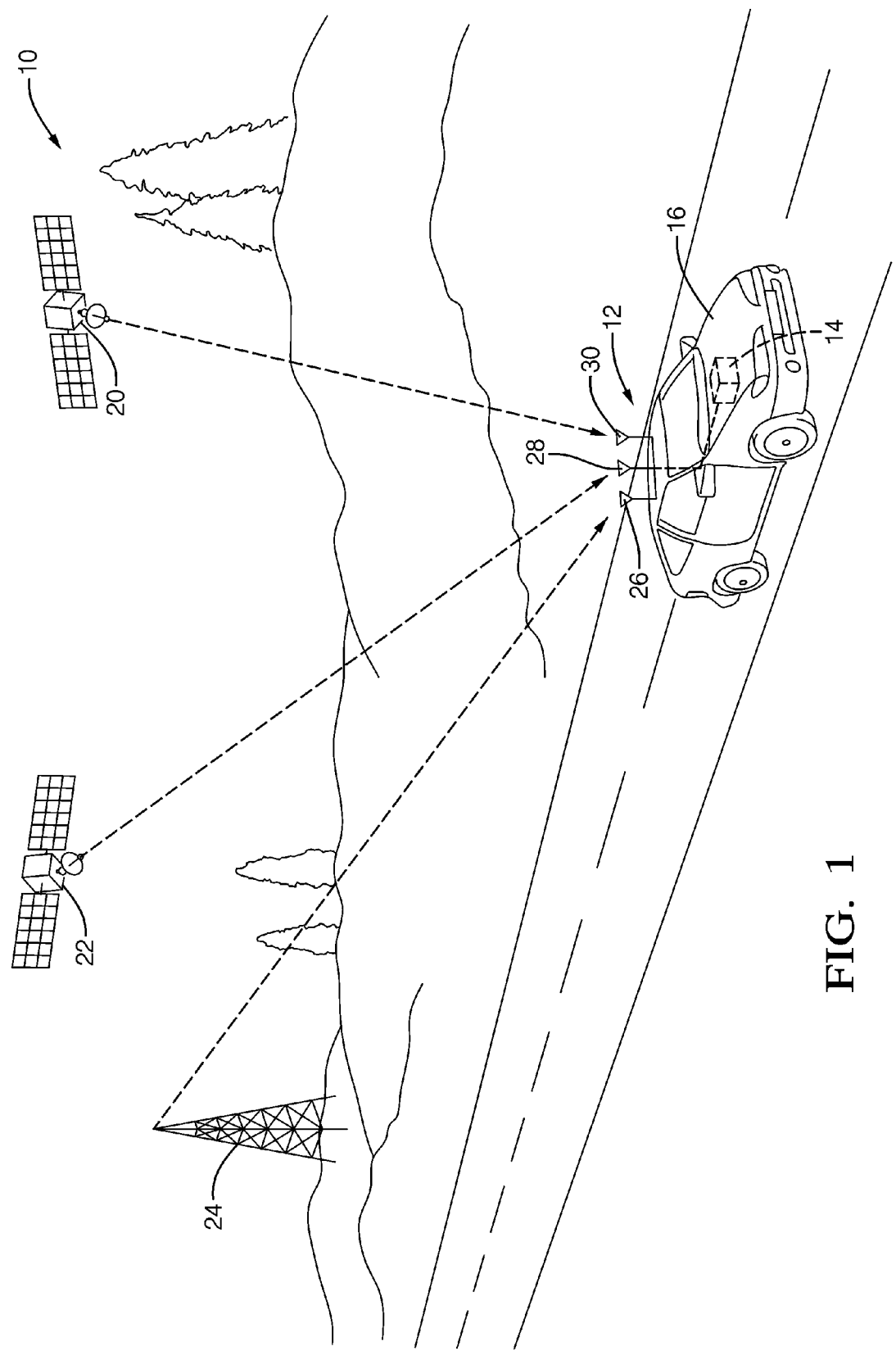
FIG. 1 is perspective view of a communication system in accordance with one embodiment.

FIG. 1 illustrates a non-limiting example of a communication system 10 that includes an antenna assembly 12 and a receiver 14. In this example the antenna assembly 12 and the receiver 14 are installed in a vehicle 16 illustrated as an automobile. It will be appreciated that the antenna assembly 12 and the receiver 14 may be installed in other types of vehicles such as watercraft or aircraft, or installed in a building such as a home or business. The system may include one or more satellites transmitting broadcast signals from orbit above the Earth's surface, and one or more terrestrial stations transmitting broadcast signals from the Earth's surface. Each satellite and terrestrial station typically receives data for broadcast from a base station (not shown) operated by a broadcast provider such as XM or Sirius satellite radio companies. In this non-limiting example, the system includes a first transmitter 20 illustrated here as a first satellite, a second transmitter 22 illustrated here as a second satellite, and a third transmitter 24 illustrated here as a terrestrial station.

The antenna assembly 12 and the receiver 14 are particularly adapted to receive signals when more than one transmitter is transmitting essentially the same information at essentially the same transmit or center frequency. As used herein, essentially the same information means that the broadcast content is the same, for example the same song is being simultaneously transmitted (e.g. time difference less than 10 seconds), but information such as data identifying the particular transmitter may differ. Similarly, as used herein, essentially the same center frequency means that the center frequencies of signals from two different transmitters are so close as to be the same with regard to receiving equipment trying to distinguish the difference. The non-limiting example of the antenna assembly 12 illustrated includes a first antenna 26, a second antenna 28, and a third antenna 30.

It should be appreciated that each of the antenna are exposed to a similar combination of the signals transmitted by the first transmitter 20, the second transmitter 22, and the third transmitter 24. As will be described in more detail below, each antenna may be configured to preferentially receive a broadcast signal having a particular characteristic such as being right hand or left hand circularly polarized, vertically or horizontally polarized, or originating from a particular direction. The directionality of an antenna may be such that one terrestrial station is preferentially received over another because of the compass bearing of the terrestrial stations relative to the antenna assembly 12, or an antenna may preferentially receive a signal having higher elevation angle, and so may preferentially receive a satellite signal over a terrestrial signal.

Figure 2:
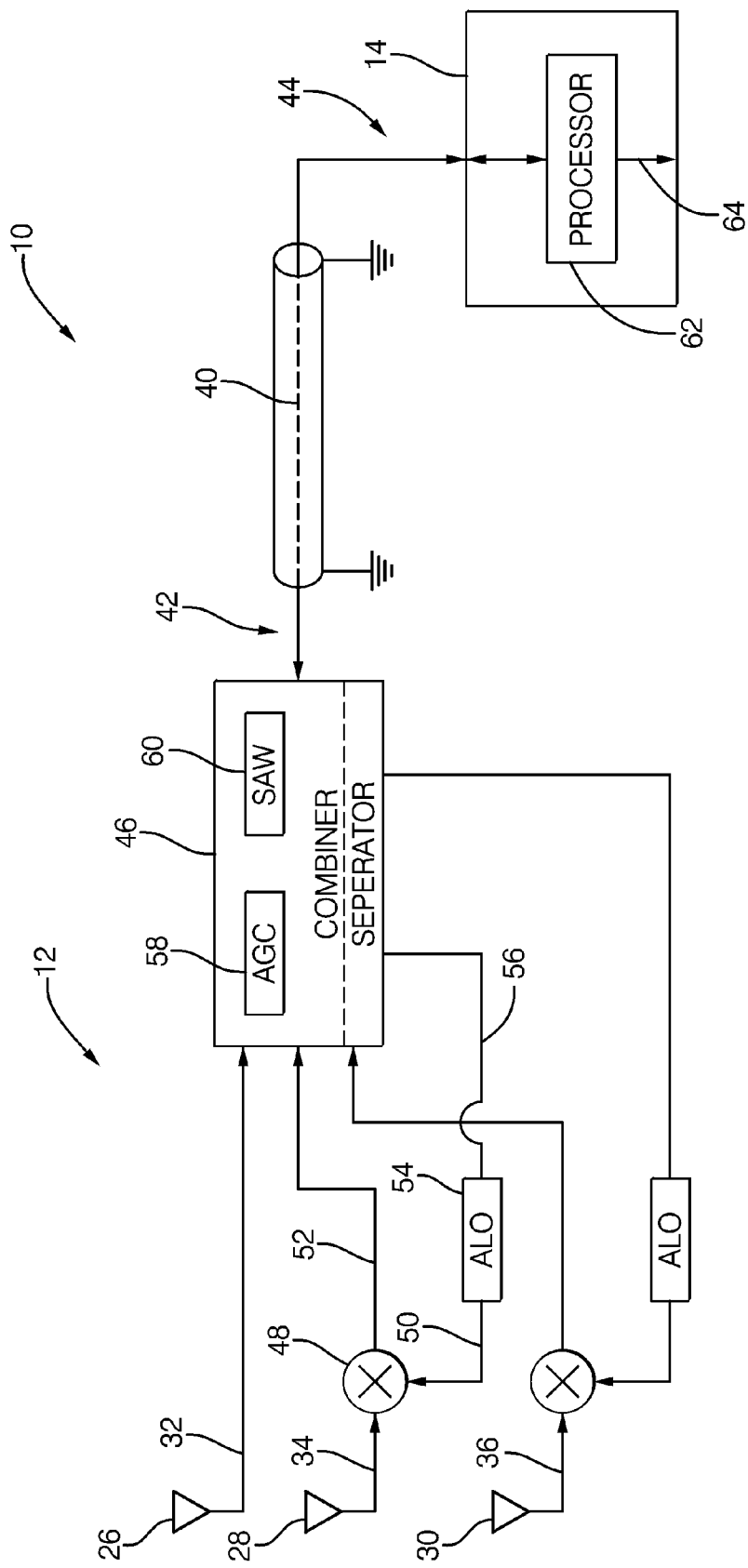
FIG. 2 is diagram of part of the communication system of FIG. 1 in accordance with one embodiment.

FIG. 2 illustrates a non-limiting example of the antenna assembly 12 and the receiver 14. It should be appreciated that even in view of the various antenna characteristics described above, each of the first antenna 26, the second antenna 28, and the third antenna 30 outputs a first received signal 32, a second received signal 34, and a third received signal 36, respectively, that may be essentially the same data in essentially the same signals at the same received center frequency. For example, the received signals 32, 34, 36 may only differ by magnitude, phase, and/or noise, and those differences may only be due to the design and/or location of the first antenna 26, the second antenna 28, and the third antenna 30.

The overall operation of the antenna assembly 12 may be described as frequency translating, or frequency shifting one or more of the plurality of antenna outputs in order to have center frequencies different than the received center frequency where the shifting produces an intermediate signal that contains the same data as the received signal. Then the various signals can be combined and transmitted on a single cable 40 without the risk of canceling or losing information.

The single cable 40 includes an antenna end 42 and a receiver end 44. The single cable 40 is preferable a coaxial type cable, but other means of propagating signals described herein may be used—twisted pair, twin-flat lead, or fiber-optic cable for example. The ends of the cable may be terminated with various connectors known to those skilled in the art to facilitate connecting the single cable 40 to the antenna assembly 12 and the receiver 14, and minimizing interference with and loss of signals propagating therebetween.

FIG. 2 illustrates that the antenna assembly 12 is configured to couple a first received signal 32 to the antenna end 42 by way of a combiner/separator 46. Devices such as the combiner/separator 46 are known in the art and serve to match various transmission impedances so various signals can be combined or separated with minimal distortion/degradation of the various signals. In this example, the first received signal 32 propagates to the antenna end 42 essentially unchanged. That is, the signal at the antenna end 42 has the same center frequency as first received signal 32 that was output by the first antenna 26.

The antenna assembly 12 may include amplifiers (not shown) near the antennas to increase the amplitude of typically weak satellite signals. In one embodiment of the system 10, the combiner/separator 46 may be configured so electrical power can be provided by the receiver 14 to such amplifiers or other devices located in the antenna assembly.

The antenna assembly 12 may include a mixer 48 configured to mix (i.e.—multiply) the second received signal 34 with a local oscillator signal 50 to provide an intermediate signal 52. The second received signal 34 is also characterized as a being centered about the same received center frequency as first received signal 32, and being modulated with essentially the same data. The intermediate signal 52 is characterized as being centered about an intermediate center frequency distinct from the received center frequency and characterized as being modulated with data from the second received signal 34. The antenna assembly 12 may also configured so the intermediate signal 52 output by the mixer 48 is coupled the antenna end 42 via the combiner/separator 46. By this arrangement, the antenna assembly 12 is able to superimpose the first received signal and the intermediate signal onto the single cable in order to propagate both signals to the receiver end in a manner that the receiver can readily separate one signal from the other using known methods.

The local oscillator signal 50 may be an adjustable local oscillator (ALO) 54 configured to detect and/or respond to a control signal 56 originating from the receiver end 44. As such, the ALO 54 may output the local oscillator signal 50 having a local oscillator frequency dependent upon the control signal 56. The combiner/separator may be configured using known techniques so the control signal 56 could be sent by the receiver 14, and separated from other signals residing on the single cable 40 so the ALO 54 receives the control signal 56. The system 10 may also include an automatic gain control (AGC) 58 and/or a surface acoustic wave (SAW) 60 installed in the combiner/separator 46, or in the receiver 14. The AGC 58 is illustrated as being after the mixer 48, but it is appreciated that the AGC could be positioned between the second antenna 28 and the mixer 48. The AGC 58 is typically configured to control an intermediate signal magnitude of the intermediate signal at the antenna end. SAW 60 is useful filter the intermediate signal to prevent other terrestrial signals (e.g. FM radio or television broadcasts) from interfering with signal processing of the intermediate signal.

FIG. 2 illustrates an additional mixer and an additional ALO configured to operate on the third received signal 36. These are illustrated to show more than two antennas are contemplated and that by operating additional mixers and ALOs, an indeterminate number of intermediate signals could be generated to process signals from an indeterminate number of antenna all receiving signals having the same center frequency.

By way of example and not limitation, the system may be generally configured to receive signals that have a received center frequency in the range of 1 Giga-Hertz (GHz) to 3 GHz. Similarly, the system may be configured so the intermediate center frequency is in the range of 75 Mega-Hertz (MHz) to 150 MHz.

By way of a more specific example, in the United States, Sirius broadcasts at center frequency of 2326.25 MHz and XM broadcasts at center frequency of 2338.75 MHz. Both Sirius and XM have an allocated band width of 12.5 MHz. If the antenna assembly 12 or the receiver is equipped with a SAW filter, a suitable filter characteristic would be 12.5 MHz band width centered at 115 MHz. Then if reception of Sirius is desired, the ALO 54 should output a local oscillator signal 50 of 2211.25 MHz. Similarly, if reception of XM is desired, the ALO 54 should output a local oscillator signal 50 of 2223.75 MHz. It should be appreciated that other band pass filter center frequencies could be used and so the local oscillator frequency would need to be changed accordingly.

The receiver 14 is generally configured to be connected to a receiver end 44 of a single cable 40 coupled to an antenna assembly 12 configured to couple a first received signal 32 and an intermediate signal 52 to the receiver end 44. The receiver 14 may include a processor 62 such as a microprocessor or other control circuitry as should be evident to those in the art. The receiver 14 may include memory (not shown), including non-volatile memory, such as electrically erasable programmable read-only memory (EEPROM) for storing one or more routines, thresholds and captured data. The one or more routines may be executed by the processor to perform steps for processing signals received by the receiver 14 as described herein. In particular, the processor 62 may be coupled to the receiver end 44 and configured to determine the control signal 56 based on which received center frequency is desired.

The determination of the control signal may be done in an open-loop manner where the control signal 56 may be based on a look-up table stored in the processor 62. However this may require using an ALO 54 that able to control the frequency of the local oscillator signal 50 relatively accurately. In an alternative embodiment, the processor 62 may be configured to measure or otherwise determine what the actual intermediate center frequency is, and adjust the control signal 56 accordingly, and thereby provide closed loop control of the intermediate center frequency.

Since the same data is available from the first received signal 32 and the second received signal 34, the receiver 14 may be configured to determine an output signal 64 based on combining the first received signal 32 and the second received signal 34 to better determine the output signal 64. Alternatively, since the same data is available from the first received signal 32 and the second received signal 34, the receiver 14 may be configured to determine an output signal 64 based on the first received signal 32 if data from the intermediate signal 52 is corrupted, and determine the output signal based on the intermediate signal 52 if data from the first received signal 32 is corrupted. The output signal may be an analog signal suitable for amplifying to operate speakers, or may be a digital signal suitable for further signal processing or storage.

The communication system 10 may be configured so the first received signal 32 includes a first data stream (not shown) and a second data stream (not shown), and the second received signal includes the same first data stream and second data stream. As used herein, the first data stream may correspond to a collection of content, such a particular song or group of songs, and the second data stream may correspond to a different collection of content. Alternatively, each data stream may be a set of channels that contain different audio/video/data services. Accordingly, the receiver may be configured to determine an output signal that includes data corresponding to the first data stream and the second data stream.

Further understanding is given by way of examples and not limitation. It is contemplated that the first data stream may be right hand circular polarized (RHCP) and the second data stream may be left hand circular polarized (LHCP). Then, if the first antenna 26 is an RHCP type antenna, and the second antenna 28 is a LCHP type antenna. In this case, the antennas themselves do most of the data separation for receiver 14, however the receiver 14 may be configured to improve the data separation. In another embodiment, the first antenna 26 may be linearly polarized (e.g. vertically polarized), and the second antenna 28 may be linearly polarized orthogonal (e.g. horizontally polarized) to the first antenna 26. In this case, the first received signal 32 can be combined (added) with a +90 degree phase shifted version of the second received signal 52 in side receiver 14 in order to process one circularly polarized transmit signal (first data stream). Similarly, receiver 14 can combine the first received signal 32 with a −90 degree phase shifted version of the second received signal 52 in order to process a second polarized transmit signal (second data stream).

Accordingly, a communication system 10, an antenna assembly 12, and a receiver 14 are provided that are able to separate signals from various transmitters that are broadcasting essentially the same information from different transmitters on the same frequency, that is having the same center frequency. The arrangements and configurations described herein provide for a single cable to interconnect the antenna assembly 12 having a plurality of antenna with the receiver 14, and provides for an adjustable local oscillator 54 controlled by the receiver 14 so that the intermediate center frequency of the intermediate signal 52 is properly tuned.

While this invention has been described in terms of the preferred embodiments thereof, it is not intended to be so limited, but rather only to the extent set forth in the claims that follow.

I claim:

1. An antenna assembly comprising:
    a single cable configured to define an antenna end of the cable and a receiver end of the cable, and allow propagation of signals therebetween;
    a first antenna configured to couple a first received signal to the antenna end, said first received signal characterized as being centered about a received center frequency and being modulated with data;
    a mixer configured to mix a second received signal with a local oscillator signal to provide an intermediate signal, said second received signal also characterized as being centered about said received center frequency and being modulated with data, said intermediate signal characterized as being centered about an intermediate center frequency distinct from said received center frequency and being modulated with data from the second received signal, said mixer further configured to couple the intermediate signal to the antenna end;
    a second antenna configured to couple the second received signal to the mixer, whereby the first received signal and the intermediate signal are superimposed on the single cable and propagate to the receiver end; and
    an adjustable local oscillator configured to detect a control signal originating from the receiver end and output the local oscillator signal having a local oscillator frequency dependent upon the control signal.

2. The assembly in accordance with claim 1, wherein the single cable is a coaxial type cable.

3. The assembly in accordance with claim 1, wherein the assembly receives electrical power via the single cable.

4. The assembly in accordance with claim 1, wherein said received center frequency is in the range of 1 Giga-Hertz (GHz) to 3 GHz, and the intermediate center frequency is in the range of 75 Mega-Hertz (MHz) to 150 MHz.

5. The assembly in accordance with claim 1, wherein the first antenna is configured to have a greater sensitivity to signals having a first polarization, and second antenna is configured to have a greater sensitivity to signals having a second polarization orthogonal to the first polarization.

6. The assembly in accordance with claim 1, wherein the assembly further comprises an automatic gain control device configured to control an intermediate signal magnitude of the intermediate signal at the antenna end.

7. The assembly in accordance with claim 1, wherein the antenna assembly is mounted on a vehicle.

8. A receiver configured to be connected to a receiver end of a single cable coupled to an antenna assembly configured to couple a first received signal and an intermediate signal to the receiver end, wherein the first received signal is characterized as having a received center frequency, the intermediate signal is based on a second received signal mixed with a local oscillator signal, wherein the second received signal is also characterized as having said received center frequency, and the local oscillator signal is characterized as having a local oscillator frequency that is dependent on a control signal, wherein the first received signal and the intermediate signal are superimposed on the single cable to propagate to the receiver end, said receiver comprising:

a processor coupled to the receiver end and configured to determine the control signal based on said received center frequency, wherein the first received signal includes a first data stream and a second data stream, and the second received signal includes the same first data stream and second data stream, wherein the receiver is configured to determine an output signal that includes data corresponding to the first data stream and the second data stream.

9. The receiver in accordance with claim 8, wherein the intermediate signal characterized as being centered about an intermediate center frequency distinct from said received center frequency, and the processor is further configured to adjust the control signal based on the intermediate center frequency.

10. The receiver in accordance with claim 8, wherein the receiver is further configured to provide electrical power to the assembly via the single cable.

11. The receiver in accordance with claim 8, wherein the receiver is configured to determine an output signal based on the first received signal and the intermediate signal.

12. A communication system comprising:

a single cable configured to define an antenna end of the cable and a receiver end of the cable, and allow propagation of signals therebetween;

a first antenna configured to couple a first received signal to the antenna end, said first received signal characterized as being centered about a received center frequency and being modulated with data;

a mixer configured to mix a second received signal with a local oscillator signal to provide an intermediate signal, said second received signal also characterized as being centered about said received center frequency and being modulated with data, said intermediate signal characterized as being centered about an intermediate center frequency distinct from said received center frequency and being modulated with data from the second received signal, said mixer further configured to couple the intermediate signal to the antenna end;

a second antenna configured to couple the second received signal to the mixer, whereby the first received signal and the intermediate signal are superimposed on the single cable and propagate to the receiver end; and an adjustable local oscillator configured to detect a control signal originating from the receiver end and output the local oscillator signal having a local oscillator frequency dependent upon the control signal; and a processor coupled to the receiver end and configured to determine the control signal based on said received center frequency.

13. The system in accordance with claim 12, wherein the first received signal has a first polarization, and the second received signal has a second polarization orthogonal to the first polarization, wherein data in both the first received signal and the second received signal include a first data stream and a second data stream.

14. The system in accordance with claim 12, wherein the processor is further configured to adjust the control signal based on the intermediate center frequency.

15. The system in accordance with claim 12, wherein the first received signal is received from a first transmitter located at a first location, and the second signal is received from a second transmitter is located at a second location distinct from the first location.

16. The system in accordance with claim 15, wherein one of the first transmitter and the second transmitter is located in orbit about the Earth, and the other is located upon the surface of the Earth.

17. The system in accordance with claim 15, wherein the first transmitter and the second transmitter are located in orbits about the Earth.

* * * * *